Sept. 12, 1967  J. R. CIELO  3,341,767
POWER INVERTER UTILIZING CONTROLLED RESONANT COMMUTATION
Filed Oct. 1, 1964

INVENTOR
JOHN R. CIELO

BY *Earl C. Hancock*
ATTORNEY

United States Patent Office 3,341,767
Patented Sept. 12, 1967

3,341,767
POWER INVERTER UTILIZING CONTROLLED RESONANT COMMUTATION
John R. Cielo, Hurley, N.Y., assignor to International Business Machines Corporation, Armonk, N.Y., a corporation of New York
Filed Oct. 1, 1964, Ser. No. 400,712
6 Claims. (Cl. 321—45)

ABSTRACT OF THE DISCLOSURE

Inverter connected controlled rectifiers are commutated out of conduction by resonant circuits coupled in parallel therewith. The resonant circuits are positively controlled by additional controlled rectifiers. Diodes are included to both isolate the output and to maintain commutation current in proportion to load current.

---

This invention relates to inverter circuits which produce alternating output pulses from an input power source which is usually a direct current supply. More particularly, this invention relates to inverter circuits which utilize at least two main controlled rectifier elements for alternately energizing a load and which further utilize commutation circuits for extinguishing the current conduction of the main controlled rectifiers.

Because of the relatively high power handling capabilities therefo, controlled rectifier transistors such as silicon controlled rectifiers have become increasingly more popular for providing operation for power circuits such as inverters. It is a characteristic of such rectifiers, however, that simply removing the conduction gate from the control electrode frequently is not sufficient to extinguish current conduction therethrough. Therefore, various circuitry has been developed for removing or cancelling the forward conduction potential between the cathode and anode of such rectifiers, these circuits being referred to as commutation circuits. Still another characteristic of controlled rectifiers is that they will sometimes conduct despite the absence of a conduction gate at the control electrode when a forward potential between the cathode and anode is too rapidly applied. This is sometimes referred to as the dv/dt problem. An arrangement for realizing commutation of a pair of main controlled rectifiers by means of a common commutating capacitor while resolving the undesired forward conduction characteristic is revealed in copending application Serial No. 380,531 entitled "Inverter With Improvied Commutation Operation" by Edward A. Menard which is assigned to the same assignee as the present application.

Many of the previous commutation circuits do not provide commutation current which is proportional to the load current, thus failing to ensure commutation in the presence of a varying load. Furthermore, many of the prior inverter circuits are arranged so that one or more controlled rectifiers which are passing the main current duing a given half of the cycle of operation must be extinguished from conduction before the other main rectifier or rectifiers are gated on or else a short circuit is placed across the input source. In such circuits, absolutely no overlap of main conduction gates can be tolerated. Still further, many of the prior art inverters can only be protected with fuses with the inherent maintenance difficulties thereof. In still other cases, a minimum of two fuses or circuit breakers must be used. The prior art efforts to produce satisfactory inverter circuits have performed with varying degrees of success, but the present invention provides a circuit which substantially overcomes all of the aforementioned shortcomings.

Basically, the present invention advantageously provides an arrangement for alternately energizing a three-terminal output device, such as the primary winding of a center-tapped transformer, from a power source by arranging two unidirectional current conducting paths across the end terminals of the output device with each path including at least one controlled rectifier. Independent resonant circuits are coupled in parallel with each controlled rectifier with the capacitive element of these resonant circuits being charged during nonconduction of the associated controlled rectifier. The resonant circuit will ring during conduction of the associated controlled rectifier, thereby producing a reverse potential across the controlled rectifier for extinguishing current conduction when the rectifier gating pulse is removed. By the fact that the independent resonant circuits are in parallel with the main controlled rectifiers, the initial charge current thereinto will be proportional to the load current which the associated controlled rectifier will have to handle. By properly gating the controlled rectifiers into conduction and removing these gates, current will alternately flow through each half of the output device, thereby producing oppositely directed output pulses for each complete cycle of operation.

In one embodiment of the present invention, the commutating circuits include in series relation with the resonant circuit an additional controlled rectifier which has in parallel therewith an oppositely poled diode. Generally, circuit operation would be initiated when at least one of these commutation rectifiers is gated into conduction, thereby permitting the capacitive element of the associated resonant circuit to charge to the input potential of the power source. Thereafter the commutation rectifier gate is removed, thereby priming the circuitry for normal operation. Subsequently, the main controlled rectifier or rectifiers associated with the charged capacitive element can be gated into conduction which permits the commutation circuit to ring once through the main rectifier and the parallel commutation diode and reverse the charge on the capacitive element. Since the commutating rectifier is not in conduction at that time, the capacitor will hold its charge which is applied across the main rectifier upon introducing a gate to the commutation rectifier thereby extinguishing the main current after removal of the conduction gate from the main rectifier. Thereafter, the amount of energy transferred to the capacitive element will be substantially proportional to the load current being handled, thus assuring commutation.

Each commutation section of an inverter in accordance with the present invention is operationally the same, and the circuitry can be modified to operate from a three-terminal input source. The circuitry of this invention is inherently less dv/dt sensitive than prior art circuits, but the circuitry can be modified to include resistive-capacitive networks for reducing dv/dt sensitivity for any or all of the controlled rectifiers. Additional diodes can be included between the end terminals of the output device and each main controlled rectifier for maintaining the capacitor charge proportional to load current as well as for preventing premature discharge of the commutating capacitive elements.

Therefore, it is an object of the present invention to provide an improved circuit capable of inverter operation by utilizing controlled rectifier elements and commutation means therefor.

It is another object of the present invention to provide an improved inverter circuit wherein the commutation of the main controlled rectifiers is accomplished independently of one another.

It is still another object of the present invention to provide an inverter circuit wherein the full input potential is applied to an output transformer during each half cycle of circuit operation.

It is yet another object of the present invention to provide an inverter circuit which can be protected from overload conditions utilizing a single circuit breaker and without fuses.

Still another object of the present invention is to provide a controlled rectifier inverter circuit wherein the commutation current is maintained proportional to the load current.

Yet another object of the present invention is to provide an inverter circuit utilizing controlled rectifiers for both main current introduction and for commutation wherein the conduction signals can be varied and even overlapped when introduced to the various controlled rectifiers without loss of circuit operation.

Another object of the present invention is to provide an inverter circuit utilizing controlled rectifier elements in an arrangement which is relatively insensitive to the dv/dt problem.

Still another object of the present invention is to provide an inverter circuit wherein the main controlled rectifier elements are automatically removed from conduction simply by removal of the gate signals thereto in an arrangement which is reliable and relatively simple to localize defective components.

The foregoing and other objects, features and advantages of the present invention will be apparent from the following more particular description of preferred embodiments of the invention as illustrated in the accompanying drawings in which.

Figure 1:
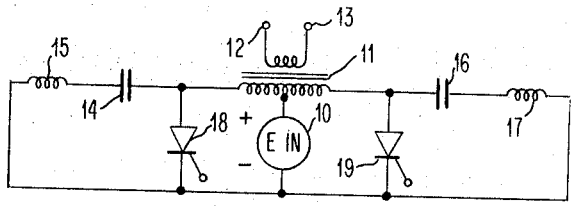
FIGURE 1 is an illustration of the basic circuitry of the present invention.

The inverter circuit shown in FIGURE 1 illustrates the fundamental operation of the present invention and, in the configuration as shown, is intended for the purpose of introducing the input power source 10 to the center-tapped transformer 11 so that two oppositely directed pulses will sequentially appear at output terimnals 12 and 13 for each complete cycle of circuit operation. Although generally the input power source preferably would be a DC supply, the circuit is intended to operate directly from an alternating or pulsating supply as well. Initially upon the application of the potential from power source 10 to the inverter circuit, two series resonant circuits, the first including capacitor 14 and inductor 15 and the second including capacitor 16 and inductor 17, will receive a charge of energy. These resonant circuits, if designed with components of equal values, will not produce any significant output potential through transformer 11 since the center-tapped arrangement of the primary windings for transformer 11 will result in a cancelling effect of the charge current for the circuits.

Controlled rectifiers 18 and 19, which typically would be silicon controlled rectifiers, are connected in series with each half of the primary of transformer 11 and are normally off during initial application of the input power. Subsequently, a conduction-causing signal can be introduced to the control electrode of either rectifier 18 or 19 causing it to conduct, thereby starting the normal inverter operation. This conduction gate would be generated by a timing or trigger circuit not shown. When rectifier 18 is conducting, the current flow from source 10 will pass through the left side of the primary of transformer 11 and produce an output pulse in a first direction at terminals 12 and 13. As long as a conduction gate is maintained at the control electrodes for 18, resonant circuit 14–15 will continue to oscillate by charging through the power source and discharging through rectifier 18. At the end of the first half of a cycle, the induction gate will be removed from the control electrode of rectifier 18 and at some period thereafter, the charge across capacitor 14 will reverse due to the normal resonant oscillating characteristics thereof and place a reverse voltage or current across the cathode-anode terminals of rectifier 18, thereby extinguishing main current flow and providing commutation.

To complete one cycle of output pulses, rectifier 19 would be gated into conduction after rectifier 18 has been commutated off, thus producing another half of an output pulse but in an opposite direction. The operation of rectifier 19 in conjunction with resonant circuit 16–17 is substantially the same as the operation for rectifier 18 as described hereinbefore.

Figure 2:
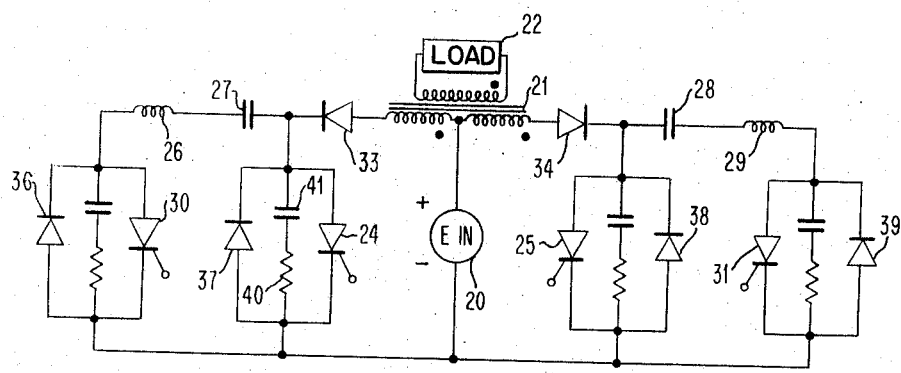
FIGURE 2 is a schematic diagram of the circuitry of the present invention including several features which can be included therein and which is adaptable to operate from a two-terminal power source input.
Figure 4:
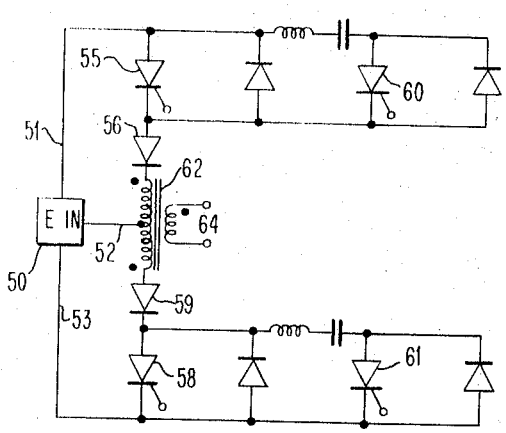
FIGURE 4 is another embodiment of the present invention particularly useful with a power source input having a three-terminal arrangement or configuration.

Although the circuitry of FIGURE 1 can provide satisfactory inverter operation in accordance with the present invention, it will frequently be desirable to employ more positive control of the commutation period, and, therefore, circuits such as are shown in FIGURES 2 and 4 will often find practical utilization. The circuit of FIGURE 1, as illustrated, is intended for the function of coupling pulses from input power source 20 through the center-tapped output transformer 21 into load 22 connected across the secondary of transformer 21.

The current flow which will produce the output pulses in the FIGURE 2 circuit will be alternately passed by means of main controlled rectifiers 24 and 25, and these rectifiers will be commutated by the circuitry including two series resonant circuits comprised of inductors 26 and 29 along with capacitors 27 and 28. In series circuit relation with these resonant circuits are commutating controlled rectifiers 30 and 31. Fundamentally, the main current conduction paths and the commutation circuits of each side of the inverter are substantially the same and in practice, the center-tapped primary winding for transformer 21 would normally divide the primary winding into two equal halves, one for rectifier 24 and the other controlled by rectifier 25. However, the balance between the two halves of the primary winding for transformer 21 need not be maintained, and the number of turns on each portion of the primary winding can be different if so desired.

To prepare the inverter of FIGURE 2 for operation, an initial input gate produced by a timing circuit (not shown) would be introduced to either controlled rectifier 30 or 31 or both. This would permit capacitors 27 and/or 28 to charge to the input potential of 20 with a positive potential on the side connected to the transformer 21.

Assuming that circuit operation is initiated by gating both commutating rectifiers 30 and 31 and these rectifiers have been caused to conduct a sufficient length of time to permit capacitors 27 and 28 to charge to the applied potential of source 20, discharge of capacitors 27 and 28 will be prevented by diodes 33, 34, 37 and 38. Thus, the conduction gate can be removed from rectifiers 30 and 31 and capacitors 27 and 28 will retain their charge with the positive potential of this charge being on the plate towards diodes 33 and 34. It should be understood that capacitors 27 and 28 can be charged to a potential greater than or less than the voltage at source 20 depending upon the time that the capacitors are permitted to charge, the type of load 22 being driven and the characteristics of the components in circuit with these capacitors.

Figure 3:
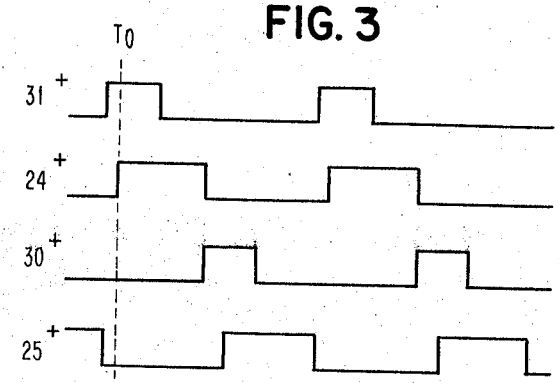
FIGURE 3 is a time base diagram of the triggers or gate signals required to operate the circuitry illustrated in FIGURE 2.

Subsequent to the initial charging of commutating capacitors 27 and 28, the cycle of timing gates applied to the controlled rectifiers is illustrated in FIGURE 3. Assume that the cycle is beginning at time T0 after the initial commutating capacitors are charged and, at this time, main controlled rectifier 24 is gated into conduction by the positive pulse illustrated in FIGURE 3. Current will then flow from the power source 20 through diode 33 and the cathode-anode circuit of rectifier 24 in a unidirectonal flow and thus produce an output pulse of a first direction or polarity at the secondary of transformer 21 for energizing load 22. After rectifier 24 has been in conduction for the equivalent of approximately one-half of the output cycle desired, the conduction gate for 24 is removed. In the meantime, however, capacitor 27 will discharge through rectifier 24, diode 36 and inductor 26. However, this current path for capacitor 27 will permit only one reversal of the capacitor charge and will thereafter block further ringing of the resonant circuit since diode 36 will block return current and rectifier 30 is not in conduction.

After the conduction gate is removed from rectifier 24, a positive conduction gate is introduced to the control electrode for rectifier 30. This will permit commutating capacitor 27 and inductor 26 to ring once more through rectifier 30 and diode 37, placing the charge potential thereof directly across the cathode-anode circuit of rectifier 24, thereby cancelling the effect of the forward conduction through rectifier 24 and extinguishing main current flow therethrough. The maintenance of rectifier 30 in conduction for a brief period subsequent to removal of the conduction gate from rectifier 24 will permit capacitor 27 to acquire a charge in proportion to the amount of load current that had been passed by rectifier 24 by means of autotransformer action through the leakage inductance of the associated portion of the primary winding on transformer 21. That is, the removal of the conduction gate for rectifier 24 and the commutation of current flow therethrough will leave a residual magnetic field around the left portion of the primary winding of transformer 21, and the collapse of this residual field will provide a transfer of energy in the form of a current flow that will charge capacitor 27 to a value proportional to the load current that 24 had been maintaining. Thus, for the next commutation cycle for controlled rectifier 24, the amount of energy for the commutation charge from capacitor 27 will be proportional to the load current which main rectifier 24 is handling and thus assure commutation of this rectifier. Furthermore, acceptance of residual current from the left side of the primary winding on transformer 21 will prevent a transient signal from appearing in the primary winding which, of course, would be sensed by load 22.

Thereafter a positive conduction gate will be applied to main controlled rectifier 25 placing it in conduction which is followed by the application of a positive conduction gate to commutation controlled rectifier 31 which will provide commutation of main rectifier 25 in a manner similar to that described for controlled rectifiers 24 and 30. Operation of rectifier 25 and the associated circuitry will produce a pulse at the secondary of transformer 21 in an opposite direction with respect to the pulse produced by rectifier 24, thereby completing one cycle of output pulses.

It should be appreciated that in the event that a sudden short circuit appears at load 22, the commutation charge acquired by capacitors 27 and 28 will be insufficient to commutate current flow through main rectifiers 24 and 25. Thus, by putting a single circuit breaker in the line between power source 20 and the center tap of transformer 21, the continued conduction of both rectifiers 24 and 25 at the same time will draw excessive current through power source 20 and cause this breaker to open, thus providing a positive circuit protection. It should be further understood that the fact that half of the primary winding of transformer 21 is in each main rectifier current path will prevent too rapid a reaction of the circuit breaker to brief overloads or surge currents and, thus, these conditions can be tolerated. This effect permits some overlapping of the conduction gates for rectifiers 24 and 25 although extended overlapping will produce an opening of the circuit breaker. Relatively small incremental increases of main current, such as might result from a varying load, will not be sufficient to actuate the aforementioned breaker because of the split primary arrangement but instead will permit commutating capacitors 27 and 28 to recover and acquire a charge sufficiently large to continue commutation of their associated main rectifiers 24 and 25. Failure of one of the main rectifiers to commutate for whatever reason will cause the breaker to open after the other main rectifier has been gated into conduction for a sufficient length of time. Such a circumstance could arise from a failure in any commutation section or failure of the conduction gate to be removed from one of the main rectifiers. Independence of the two main rectifier and associated commutation sections of the present invention when functioning as an inverter facilitates localization of a faulty component since operation of half of the circuitry can be prevented while the other half is being investigated. This same feature permits relatively high reliability of overall operation since half the circuitry can continue to operate despite complete failure of the other half although the output power capability is reduced. This loss of power could be at least partially compensated for by increasing the "on" time of the main controlled rectifier section still in operation.

Another feature of this invention is that the power source 20 is fully applied to the primary of transformer 21 for each half of the operating cycle, thus assuring maximum utilization of the input power available. The only requirement for turning off the inverter circuit of FIGURE 2 is that the conduction gates for main rectifiers 24 and 25 be removed. By normal commutation operation of controlled rectifiers 30 and 31, current flow through the main rectifiers will be terminated, and the system will cease operation automatically. Since the disclosed system is capable of handling variations of the gate signals to the controlled rectifiers, the circuitry of the present invention is easily adaptable for time-ratio regulation. Still another feature of circuitry in accordance with the present invention resides in the fact that the associated portion of the primary of transformer 21 will assist diodes 37 and 38 in recovering when current flow through rectifiers 24 and 25 is terminated by providing an impedance to limit the reverse recovery current for the diodes which could result from the other main rectifier being gated on. The application of negative gates to the controlled rectifiers when the positive gate is removed could be utilized if so desired to further assist the current flow termination therethrough but simply removing the gates will generally be sufficient.

When controlled rectifiers, such as silicon controlled rectifiers, are utilized, these elements can be forced into conduction by too rapid an application of forward cathode-anode potential thereacross despite the absence of a conduction gate at the control electrode. This is referred to as the dv/dt problem and is discussed in some detail in the circuitry disclosed in copending application Ser. No. 380,531 by Edward A. Menard, mentioned hereinbefore. In the present circuitry, the use of the center-tapped primary winding for transformer 21 at least somewhat reduces the dv/dt sensitivity of the main controlled rectifiers. However, if it is desired to further reduce this sensitivity, a series of resistor-capacitor networks can be included across any or all of the controlled rectifiers. One of these networks including resistor 40 and capacitor 41 is shown across main controlled rectifier 24. The ratio of the commutating capacitor 27 to capacitor 41 is maintained relatively large (i.e., the value of capacitor 27 is much greater than the value of capacitor 41). The inclusion of the network including resistor 40 and capacitor 41 has the effect of placing a potential across main controlled rectifier 24 which reduces the slope of the voltage across this rectifier when the current in the resonant circuit including inductor 26 and capacitor 27 drops to zero.

More specifically, when rectifier 30 is gated into conduction immediately after removal of the conduction gate from main rectifier 24, capacitor 27 will discharge through rectifier 30 and diode 37. However, inductor 26 will force this discharge to continue until capacitor 27 has acquired a reverse charge. Since current flow cannot reverse around this loop, after reversal of the charge on capacitor 27, the voltage across inductor 26 must then immediately drop to zero and forward conduction potential would be suddenly applied across controlled rectifier 24 as a result. If this application of potential were of too steep an initial slope, controlled rectifier 24 could return to conduction. However, a portion of this forward potential is accepted by the resistor 40-capacitor 41 network, thus reducing this slope and preventing inadvertent conduction of 24. It is because of the relative isolation of the main and commutation controlled rectifiers that the RC networks can be employed effectively in the present invention for providing dv/dt reduction.

FIGURE 4 illustrates another embodiment of the present invention particularly adapted for operating from a three-terminal input power source, E$in$. For power source 50 as shown, it will be assumed that the potential at end terminal 51 is positive with respect to the potential at intermediary terminal 52 while the potential intermediary terminal 52 is positive with respect to end terminal 53. One-half of the output pulse is produced from the potential between terminals 51 and 52 by means of a unidirectional current path including main controlled rectifier 55 and diode 56 while the other half of the output pulse is produced from the potential between terminals 52 and 53 by means of the unidirectional current path including main controlled rectifier 58 and diode 59. Operation of the main rectifier circuits and the commutation circuits including controlled rectifiers 60 and 61 along with the associated diodes and series resonant circuits as is shown in FIGURE 4 are all substantially the same as has been shown and described hereinbefore for FIGURE 2. The inclusion of RC networks similar to those shown in FIGURE 2 for reduction of dv/dt sensitivity can be incorporated in FIGURE 4 as they were in FIGURE 2. The initial charging, timing and other operations of FIGURE 4 are substantially the same as shown in FIGURE 2. It is necessary to observe only the proper polarity for the output transformer 62 to assure that the output pulses for output 64 are oppositely directed when produced by controlled rectifiers 55 and 58.

While the invention has been particularly shown and described with reference to the preferred embodiments thereof, it will be understood by those skilled in the art that various changes in form and details may be made therein without departing from the spirit and scope of this invention. The invention has been illustrated and described as an inverter circuit, but it is to be understood that the invention can be utilized for many other applications, such as for driving pulse transformers or resistive loads. In addition, it has been found to be convenient for purposes of clarity of expression to discuss the present invention in the foregoing description and the following claims in terms of driving a center-tapped transformer. However, it is to be recognized that the circuitry of this invention can be utilized to drive any suitable output device instead of a center-tapped transformer. For instance, a dual winding motor, a three-terminal resistive load, a pair of separate output transformers or the like could be directly driven by the unidirectional conducting paths, including the main controlled rectifiers, and such configurations would still be within the intended spirit of the foregoing specification and the appended claims.

What is claimed is:
1. An inverter circuit comprising
an output device having first and second impedance sections commonly connected on one side,
a power source connected between said common connection and a circuit point,
first and second diodes connected on one side to respective ones of the other side of said impedance sections,
first and second controlled rectifiers commonly connected on one side to said circiut point and on the other side to the other sides of said first and second diodes, respectively,
said diodes and said rectifiers being arranged for providing a pair of unidirectional conducting paths for said power source through the associated said impedance section,
third and fourth controlled rectifiers having the same side connected to said circuit point as said first and second controlled rectifiers,
a pair of series resonant circuits connected to the other side of respective said third and fourth controlled rectifiers for providing first and second commutating circuits, said commutating circuits being coupled in parallel with respective ones of said first and second controlled rectifiers,
third and fourth diodes connected in parallel with said third and fourth controlled rectifiers, respectively, but in opposite current conduction relation with respect thereto, and
control means for initiating circuit operation by introducing and removing the first conduction causing signal to at least one of said third and fourth controlled rectifiers and for, cyclically introducing and removing conduction causing signals to said controlled rectifiers thereafter, said unidirectional conducting paths and said control means being arranged for alternately producing oppositely directed pulses relative to said output device with said commutating circuits being responsive to said control means for introducing signals across said first and second controlled rectifiers for extinguishing current conduction therethrough.

2. An inverter in accordance with claim 1 which includes an additional pair of diodes connected in parallel with respective ones of said first and second controlled rectifiers but in opposite conduction relation with respect thereto.

3. An inverter in accordance with claim 2 which includes four networks each including a resistor and a capacitor connected in series, said networks being coupled in parallel with respective ones of said controlled rectifiers.

4. An inverter circuit comprising
a transformer having a center tapped primary winding and a secondary winding,
a three terminal power source having a pair of end terminals and an intermediary terminal with the latter said terminal being coupled to the center tap of said transformer,
first and second diodes connected on one side to respective ends of said primary winding,
a first controlled rectifier connected to the other side of said first diode with said first rectifier and said first diode being serially arranged for completing a unidirectional conduction path between one of said end terminals and said intermediary terminal,
a second controlled rectifier connected to the other side of said second diode with said second rectifier and said diode being serially arranged for providing a unidirectional conduction path between the other of said end terminals and said intermediary terminal,
third and fourth controlled rectifier,
first and second commutating circuits coupled in parallel with said first and second controlled rectifiers, respectively, and each including a series resonant circuit connected in series with a respective one of said third and fourth controlled rectifiers,
third and fourth diodes connected in parallel with said third and fourth controlled rectifiers, respectively, but in opposite current conduction relation thereto, and
means for gating said controlled rectifiers into conduction with said commutating circuits extinguishing conduction through the said controlled rectifier coupled in parallel therewith after removal of the conduction gate therefrom, said unidirectional conduction paths and said gating means being constructed and arranged for alternately introducing oppositely directed pulses to said secondary winding, said gating means being arranged for initiating circuit operation by introducing the first conduction signal to at least one of said third and fourth controlled rectifiers.

5. An inverter in accordance with claim 4 which includes a second additional pair of diodes connected in parallel with respective ones of said first and second controlled rectifiers but in opposite conduction relation thereto.

6. An inverter in accordance with claim 5 which includes four networks each including a series resistor-capacitor arrangement, said networks being connected in parallel with respective ones of said controlled rectifiers.

References Cited

UNITED STATES PATENTS

| | | | |
|---|---|---|---|
| 3,164,767 | 1/1965 | Morgan | 321—45 X |
| 3,181,053 | 4/1965 | Amato | 321—45 |
| 3,197,691 | 7/1965 | Gilbert | 321—18 |
| 3,207,974 | 9/1965 | McMurray | 321—45 |
| 3,213,287 | 10/1965 | King | 321—45 X |
| 3,281,644 | 10/1966 | Moore et al. | 321—45 |
| 3,303,406 | 2/1967 | Bedford | 321—44 |
| 3,303,407 | 2/1967 | Dependbrock | 321—45 |

JOHN F. COUCH, *Primary Examiner.*

W. M. SHOOP, Jr., *Assistant Examiner.*